US008842751B2

(12) United States Patent
Lee

(10) Patent No.: US 8,842,751 B2
(45) Date of Patent: Sep. 23, 2014

(54) APPARATUS AND METHOD FOR ESTIMATING CHANNEL IN WIRELESS COMMUNICATION SYSTEM

(75) Inventor: Sang-Dae Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 356 days.

(21) Appl. No.: 13/050,213

(22) Filed: Mar. 17, 2011

(65) Prior Publication Data

US 2011/0249773 A1 Oct. 13, 2011

(30) Foreign Application Priority Data

Apr. 7, 2010 (KR) .................. 10-2010-0031726

(51) Int. Cl.
*H04L 27/00* (2006.01)
*H04L 25/02* (2006.01)

(52) U.S. Cl.
CPC .......... *H04L 25/0236* (2013.01); *H04L 25/024* (2013.01)
USPC ........................................................ 375/260

(58) Field of Classification Search
CPC .............. H04L 25/024; H04L 25/0234; H04L 25/0202; H04L 25/0204; H04L 25/0222; H04L 25/0232; H04L 25/0236; H04L 5/0048
USPC ........... 375/316, 260, 340, 343; 370/203, 344
See application file for complete search history.

(56) References Cited

U.S. PATENT DOCUMENTS

| | | | |
|---|---|---|---|
| 2006/0133529 A1* | 6/2006 | Lee et al. ...................... | 375/260 |
| 2007/0217328 A1* | 9/2007 | Bune et al. .................... | 370/208 |
| 2008/0117995 A1* | 5/2008 | Anderson et al. ............. | 375/260 |
| 2009/0268709 A1* | 10/2009 | Yu ................................. | 370/350 |
| 2010/0002788 A1* | 1/2010 | Wu et al. ....................... | 375/260 |
| 2010/0040154 A1* | 2/2010 | Carbonelli et al. ........... | 375/260 |
| 2010/0272194 A1* | 10/2010 | Zhengang et al. ............ | 375/260 |

\* cited by examiner

*Primary Examiner* — Aristocratis Fotakis
(74) *Attorney, Agent, or Firm* — Jefferson IP Law, LLP

(57) ABSTRACT

An apparatus method of estimating a channel in a wireless communication system are provided. The method includes determining channel estimation values of pilot tones, selecting data tones to which a first estimation scheme is applied, according to frequency selectivity and time-axis variance of the channel, determining channel estimation values of the selected data tones according to the first estimation scheme by using the channel estimation values of the pilot tones, and determining channel estimation values of the remaining data tones according to a second estimation scheme by using the channel estimation values of the pilot tones and the channel estimation values determined by the first estimation scheme.

20 Claims, 5 Drawing Sheets

APPARATUS AND METHOD FOR ESTIMATING CHANNEL IN WIRELESS COMMUNICATION SYSTEM

PRIORITY

This application claims the benefit under 35 U.S.C. §119 (a) of a Korean patent application filed in the Korean Intellectual Property Office on Apr. 7, 2010 and assigned Serial No. 10-2010-0031726, the entire disclosure of which is hereby incorporated by reference.

BACKGROUND OF THE INVENTION

1. Field of the Invention

The present invention relates to a wireless communication system. More particularly, the present invention relates to an apparatus and method for estimating a channel in a wireless communication system.

2. Description of the Related Art

An Orthogonal Frequency Division Multiplexing (OFDM) transmission scheme based on multiple-carrier transmission has a 2 Dimensional (2D) structure in which signals are deployed in a symbol axis and a subcarrier axis, and pilots are also deployed according to the 2D structure. This structure has an advantage over other systems in terms of estimating a channel having a multi-path fading property. When estimating the channel, channel estimation capability is increased in proportion to the number of pilots, but as a result, the number of data signals is decreased relatively. Accordingly, the number of pilots that can be allocated is limited.

In the OFDM system, a receiving end first estimates a channel of a pilot tone, and then estimates a channel value of a data tone by using a channel estimation value. A Least Square (LS) scheme is used as a scheme of estimating the channel of the pilot tone. Linear interpolation, Low Pass Filter (LPF), Minimum Mean Square Error (MMSE), Wiener filtering, etc., are used as a scheme of estimating the channel of the data tone.

Linear interpolation is a scheme of estimating a channel value of a data tone by performing interpolation on a previously estimated pilot channel estimation value between adjacent values. Linear interpolation has an advantage in that a computational operation is simple and the complexity is small, but has a disadvantage in that channel estimation capability deteriorates when there is a significant change in a channel. Wiener filtering shows excellent performance, but has a disadvantage in that its complexity is high since it uses a process of obtaining a Wiener weight by performing an auto-correlation operation between pilots and a cross-correlation operation between data and a pilot.

Therefore, a high performance channel estimation scheme, such as Wiener filtering, is suitable when a channel environment has a fast fading property, and a simple channel estimation scheme, such as linear interpolation, is suitable when the channel environment changes slowly. Accordingly, there is a need for an apparatus and method for improving channel estimation capability by taking advantage of the two channel estimation schemes.

SUMMARY OF THE INVENTION

Aspects of the present invention address at least the above-mentioned problems and/or disadvantages and provide at least the advantages described below. Accordingly, an aspect of the present invention is to provide an apparatus and method for estimating a channel according a scheme suitable for various channel environments in a wireless communication system.

Another aspect of the present invention is to provide an apparatus and method for adaptively selecting a channel estimation scheme according to a channel environment in a wireless communication system.

Another aspect of the present invention is to provide an apparatus and method for using a plurality of channel estimation schemes according to a channel environment in a wireless communication system.

In accordance with an aspect of the present invention, a method of estimating a channel of a receiving end in a wireless communication system is provided. The method includes determining channel estimation values of pilot tones, selecting data tones to which a first estimation scheme is applied, according to frequency selectivity and time-axis variance of the channel, determining channel estimation values of the selected data tones according to the first estimation scheme by using the channel estimation values of the pilot tones, and determining channel estimation values of the remaining data tones according to a second estimation scheme by using the channel estimation values of the pilot tones and the channel estimation values determined by the first estimation scheme.

In accordance with another aspect of the present invention, a receiving apparatus in a wireless communication system is provided. The apparatus includes a pilot estimator for determining channel estimation values of pilot tones, a determination unit for selecting data tones to which a first estimation scheme is applied according to frequency selectivity and time-axis variance of the channel, a first estimator for determining channel estimation values of the selected data tones according to the first estimation scheme by using the channel estimation values of the pilot tones, and a second estimator for determining channel estimation values of the remaining data tones according to a second estimation scheme by using the channel estimation values of the pilot tones and the channel estimation values determined by the first estimation scheme.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
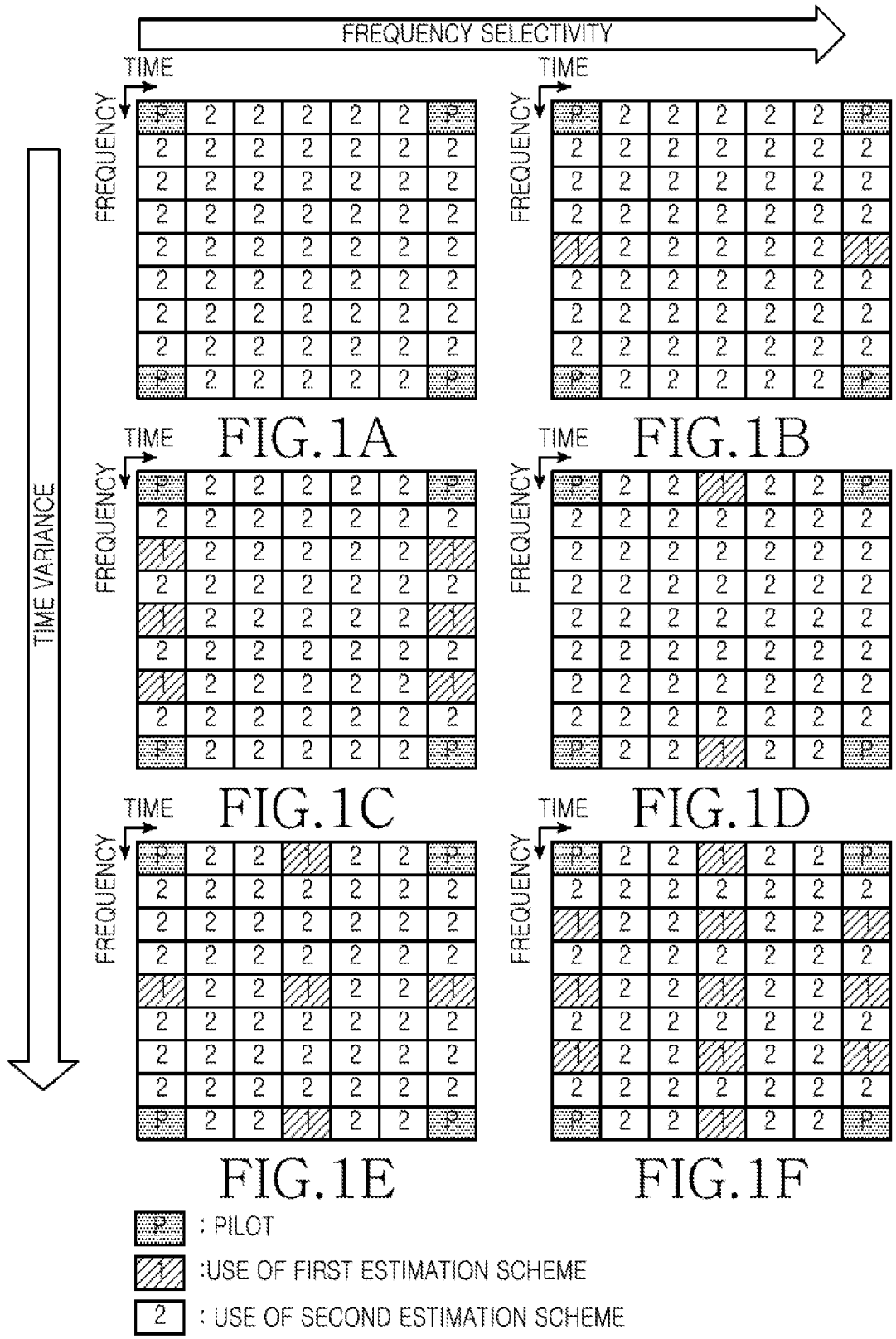
FIGS. 1A to 1F illustrate applicable distribution of a channel estimation scheme based on a channel property in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described below relate to a technique for estimating a channel according to a scheme suitable for various channel environments in an Orthogonal Frequency Division Multiplexing (OFDM)/Orthogonal Frequency Division Multiple Access (OFDMA) wireless communication system.

A receiving end uses a plurality of channel estimation schemes according to exemplary embodiments of the present invention. That is, the receiving end uses a first estimation scheme having high computational complexity and excellent performance and a second estimation scheme having low computational complexity and relatively poor performance. For example, the first estimation scheme may be Minimum Mean Square Error (MMSE), Wiener filtering, etc., and the second estimation scheme may be linear interpolation, Low Pass Filter (LPF), etc.

The receiving end estimates channel values of data tones by using channel estimation values of pilot tones according to the second estimation scheme. In this case, the receiving end applies the first estimation scheme preferentially to some data tones according to a channel property, i.e., frequency selectivity and time variance. The channel estimation values determined by the first estimation scheme are not as accurate as the channel estimation values of the pilot tones, but are more accurate than the channel estimation values determined by the second estimation scheme. Therefore, the receiving end uses channel estimation values obtained for some data tones according to the first estimation scheme as if they are the channel estimation values of the pilot tones. In other words, when a channel is estimated by the second estimation scheme, the receiving end uses not only the channel estimation values determined for the pilot tones but also the channel estimation values determined for the data tones according to the first estimation scheme as the channel estimation values of the pilot tones. That is, the data tones to which the first estimation scheme is applied are used as semi-pilots when the channel is estimated by the second estimation scheme.

FIGS. 1A to 1F illustrate applicable distribution of a channel estimation scheme based on a channel property in a wireless communication system according to an exemplary embodiment of the present invention. Distribution of data tones to which the first estimation scheme or the second estimation scheme is applied according to a degree of frequency selectivity and time variance of a channel is shown in FIGS. 1A to 1F. The frequency selectivity is increased from the left to the right, and the time variance is increased from the top to the bottom.

Referring to FIGS. 1A to 1F, the lower the frequency selectivity and the time variance, the greater the number of data tones to which the second estimation scheme is applied. On the contrary, the higher the frequency selectivity and the time variance, the greater the number of data tones to which the first estimation scheme is allocated. More specifically, Referring to FIG. 1A where the frequency selectivity is low and the time variance is low, the first estimation scheme is not used. Referring to FIG. 1B, where the frequency selectivity satisfies a specific level and the time variance is low, the first estimation scheme is applied to one data tone between pilot tones on the same subcarrier. Referring to FIG. 1C, where the frequency selectivity is high and the time variance is low, the first estimation scheme is allocated to 3 data tones between pilot tones on the same subcarrier. Referring to FIG. 1D, where the frequency selectivity is low and the time variance is high, the first estimation scheme is applied to one data tone between pilot tones on the same symbol. Referring to FIG. 1E, where the frequency selectivity satisfies a specific level and the time variance is high, the first estimation scheme is applied to one data tone between pilot tones on the same subcarrier and one data tone between pilot tones on the same symbol. Referring to FIG. 1F, where the frequency selectivity is high and the time variance is high, the first estimation scheme is applied to three data tones between pilot tones on the same subcarrier and one data tone between pilot tones on the same symbol.

The data tones to which the first estimation scheme is applied are used as semi-pilots in addition to actual pilots used when channel estimation is performed based on the second estimation scheme. Accordingly, the same effect as if the number of pilot tones is increased can be obtained when estimating a channel according to the second estimation scheme. Although the channel estimation value of the semi-pilot tone has worse estimation performance in comparison with a channel estimation value of the actual pilot tone, the same effect as if the number of pilot tones is increased can be obtained without decreasing the number of data tones. Further, it is not required to increase/decrease the number of pilot tones according to a channel property in a transmitting end.

In order to determine the data tones to which the first estimation scheme is applied as illustrated in FIGS. 1A to 1F above, the transmitting end should determine the frequency selectivity and the time variance of the channel. The frequency selectivity and the time variance may be determined as described below.

Figure 2:
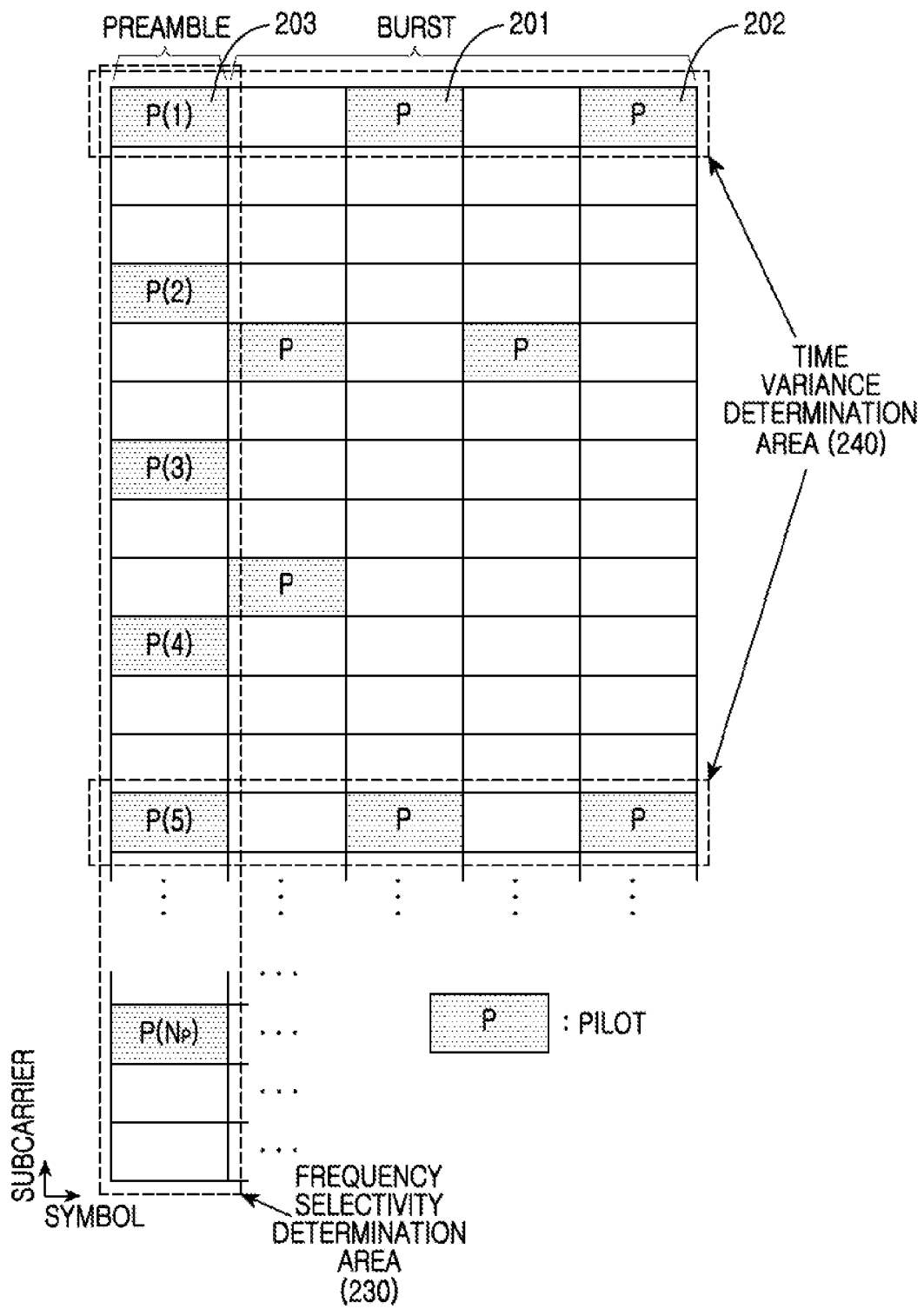
FIG. 2 illustrates pilot usage for determining frequency selectivity and time variance in a wireless communication system according to an exemplary embodiment of the present invention.

FIG. 2 illustrates pilot usage for determining frequency selectivity and time variance in a wireless communication system according to an exemplary embodiment of the present invention.

Referring to FIG. 2, pilots are used to determine the frequency selectivity and the time variance. In this case, a frequency selectivity determination area 230 for determining the frequency selectivity includes pilots included in a preamble, and a time variance determination area 240 for determining the time variance includes bursts located in the same subcarrier and pilots included in a preamble.

The determination of the frequency selectivity is performed by using $N_p$ pilots included in the frequency selectivity determination area 230. To determine the frequency selectivity, a receiving end estimates a channel of data tones included in the preamble by varying the number of pilots used in the preamble, and determines the frequency selectivity by using a difference between channel estimation values of the data tones for each of possible cases. That is, the channel estimation values of the data tones are determined for three cases, i.e., a case of using $N_p$ pilots, a case of using $N_p/2$ pilots, and a case of using $N_p/3$ pilots. In the case of using $N_p$ pilots, pilots indexed with 1, 2, 3, 4, 5, ..., $N_p$ are used. In the case of using $N_p/2$ pilots, pilots indexed with 1, 3, 5, ..., $N_p$ are used. In the case of using $N_p/3$ pilots, pilots indexed with 1, 4, ..., $N_p$ are used.

After determining the channel estimation values of the data tones by varying the number of pilots, the receiving end calculates a Mean Square Error (MSE) of respective channel estimation values for the case of using $N_p/2$ pilots and for the case of using $N_p/3$ pilots over the channel estimation values for the case of using $N_p$ pilots. For example, the MSE can be calculated by Equation 1 below.

$$\left( MSE_{Np/2} = \frac{1}{\text{Num\_data}} \sum_{i=1}^{\text{Num\_data}} \frac{|\hat{H}_{Np(i)} - \hat{H}_{Np/2(i)}|^2}{|\hat{H}_{Np(i)}|^2}, \right. \quad (1)$$

$$\left. MSE_{Np/3} = \frac{1}{\text{Num\_data}} \sum_{i=1}^{\text{Num\_data}} \frac{|\hat{H}_{Np(i)} - \hat{H}_{Np/3(i)}|^2}{|\hat{H}_{Np(i)}|^2} \right)$$

In Equation 1 above, $MSE_{Np/2}$ denotes an MSE between a channel estimation value in the case of using $N_p/2$ pilots over a channel estimation value in the case of using $N_p$ pilots, Num_data denotes the number of data tones included in a preamble, $\hat{H}_{Np(i)}$ denotes a channel estimation value of an $i^{th}$ data tone in the case of using $N_p$ pilots, $\hat{H}_{Np/2(i)}$ denotes a channel estimation value of an $i^{th}$ data tone in the case of using $N_p/2$ pilots, $MSE_{Np/3}$ denotes an MSE of channel estimation values in the case of using $N_p/3$ pilots over the channel estimation values in the case of using $N_p$ pilots, and $\hat{H}_{Np/3(i)}$ denotes a channel estimation value of an $i^{th}$ data tone in the case of using $N_p/3$ pilots.

Figure 3A:
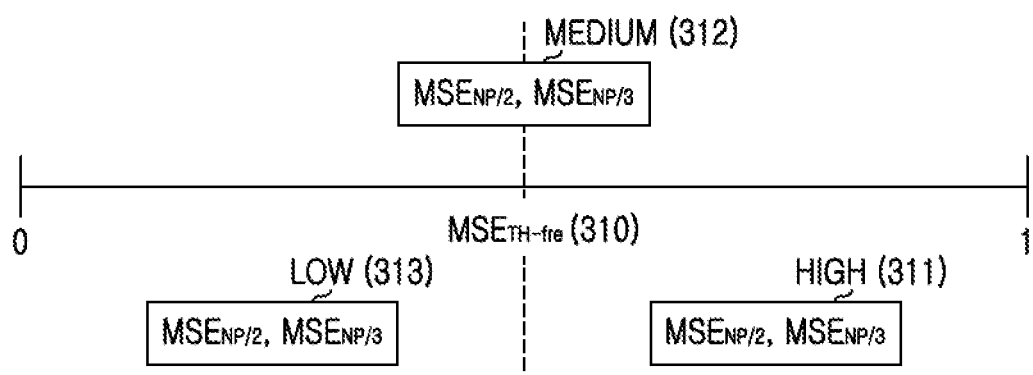
FIGS. 3A and 3B are diagrams illustrating criteria for determining frequency selectivity and time variance in a wireless communication system according to an exemplary embodiment of the present invention.
Figure 3B:
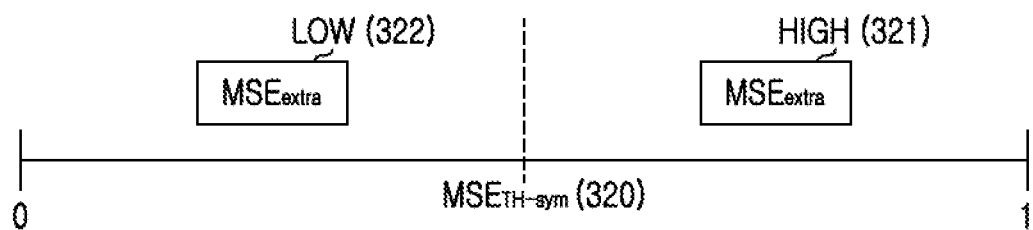

FIGS. 3A and 3B are diagrams illustrating criteria for determining frequency selectivity and time variance in a wireless communication system according to an exemplary embodiment of the present invention.

Referring to FIG. 3A, the $MSE_{Np/2}$ and the $MSE_{Np/3}$ are in the range of 0 to 1, and there is a threshold $MSE_{TH\_Fre}$ 310 for determining the frequency selectivity. Therefore, three cases occur according to a magnitude relation among the $MSE_{Np/2}$, the $MSE_{Np/3}$, and the $MSE_{TH\_Fre}$ 310. When a degree of the frequency selectivity is classified into a high 311, a medium 312, and a low 313, the frequency selectivity is determined to be high 311 if both the $MSE_{Np/2}$ and the $MSE_{Np/3}$ are greater than or equal to the $MSE_{TH\_Fre}$ 310, or is determined to be medium 312 if the $MSE_{Np/2}$ is less than or equal to the $MSE_{TH\_Fre}$ 310 and if the $MSE_{Np/3}$ is greater then or equal to $MSE_{TH\_Fre}$ 310, or is determined to be low 313 if both the $MSE_{Np/2}$ and the $MSE_{Np/3}$ are less than or equal to the $MSE_{TH\_Fre}$ 310. Accordingly, channel estimation is performed as illustrated in FIG. 1C or FIG. 1F when the degree is the high 311, as illustrated in FIG. 1B or FIG. 1E when the degree is the medium 312, or as illustrated in FIG. 1A or FIG. 1D when the degree is the low 313.

Referring again to FIG. 2, the time variance is determined by using pilots located on the same subcarrier among pilots included in the time variance determination area 240. In this case, the time variance determination area 240 is determined to include a subcarrier on which a pilot is located in a preamble. The receiving end calculates an inclination of two pilot tones 201 and 202 by using interpolation on channel estimation values of the two pilot tones 201 and 202 included in a burst, and calculates a channel estimation value for a pilot tone 203 included in a preamble by using extrapolation on the two pilot tones 201 and 202. Further, the receiving end determines the time variance by comparing a channel estimation value calculated for the pilot tone 203 included in the preamble by using the two pilot tones 201 and 202 included in the burst and a channel estimation value obtained for the pilot tone 203 by using the pilot. That is, the time variance is determined according to an MSE between the channel estimation value calculated for the pilot tone 203 by using the two pilot tones 201 and 202 included in the burst and the channel estimation value determined for the pilot tone 203 by using the pilot. For example, the MSE can be determined by Equation 2 below.

$$\left( MSE_{extra} = \frac{1}{\text{Num\_extra}} \sum_{i=1}^{\text{Num\_extra}} \frac{|\hat{H}_{preamble(i)} - \hat{H}_{extra(i)}|^2}{|\hat{H}_{preamble(i)}|^2} \right) \quad (2)$$

In Equation 2 above, $MSE_{extra}$ denotes an MSE between a channel estimation value calculated for a pilot tone included in a preamble by using a channel estimation value for a pilot tone included in a burst and a channel estimation value estimated in a preamble, Num_extra denotes the number of subcarriers used to determine time variance, $\hat{H}_{preamble(i)}$ denotes a channel estimation value determined for an $i^{th}$ pilot tone included in a preamble by using a pilot, and $\hat{H}_{extra(i)}$ denotes a channel estimation value calculated for an $i^{th}$ pilot tone included in a preamble by using extrapolation.

The time variance is determined as illustrated in FIGS. 3A and 3B by using the $MSE_{extra}$. Referring to FIG. 3B, the $MSE_{extra}$ is in the range of 0 to 1, and there is a threshold $MSE_{TH\_sym}$ 320 for determining the time variance. When a degree of the time variance is classified into a high 321 and a low 322, the time variance is determined to be high 321 if the $MSE_{extra}$ is greater than or equal to the $MSE_{TH\_sym}$ 320, or is determined to be low 322 if the $MSE_{extra}$ is less than the $MSE_{TH\_sym}$ 320. Accordingly, channel estimation is performed as illustrated in FIG. 1D, 1E, or 1F when the degree is the high 321, or as illustrated FIG. 1A, 1B, or 1C when the degree is the low 322.

Hereinafter, an exemplary structure and operation of a receiving end for estimating a channel as described above will be described with reference to the accompanying drawings.

Figure 4:
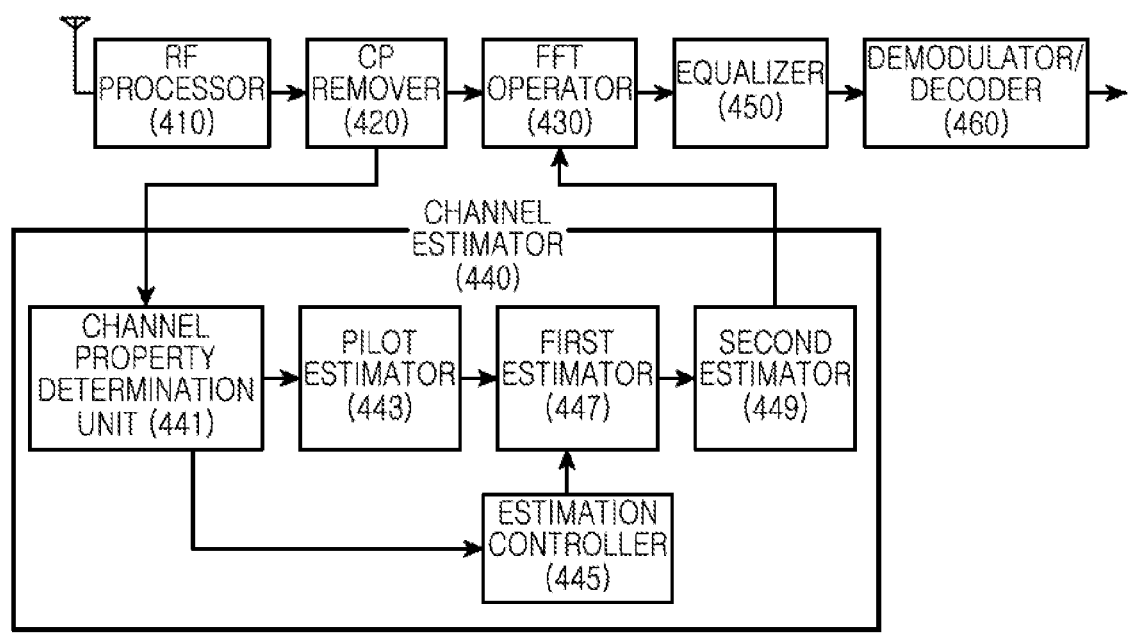
FIG. 4 is a block diagram of a receiving end in a wireless communication system according to an exemplary embodiment of the present invention.

FIG. 4 is a block diagram of a receiving end in a wireless communication system according to an exemplary embodiment of the present invention.

Referring to FIG. 4, the receiving end includes a Radio Frequency (RF) processor 410, a Cyclic Prefix (CP) remover 420, a Fast Fourier Transform (FFT) operator 430, a channel estimator 440, an equalizer 450, and a demodulator/decoder 460.

The RF processor 410 convert an RF signal received through an antenna into a baseband signal. The CP remover 420 splits the baseband signal on an OFDM symbol basis, and removes a CP from each OFDM symbol. The FFT operator 430 performs an FFT operation on the OFDM symbol from which the CP is removed, and thus restores received signal values per subcarrier. By using received values of pilot tones provided from the FFT operator 430, the channel estimator 440 estimates channel values of the pilot tones and data tones. The equalizer 450 receives the channel estimation values of the data tones from the channel estimator 440, and compensates for distortion of data signals provided from the FFT operator 430 by using the channel estimation values. The demodulator/decoder 460 restores received data by demodulating and decoding the data signals provided from the equalizer 450.

The channel estimator 440 estimates a channel by adaptively using the first estimation scheme and the second estimation scheme according to a channel property. The channel estimator 440 includes a channel property determination unit 441, a pilot estimator 443, an estimation controller 445, a first estimator 447, and a second estimator 449.

The channel property determination unit 441 determines a degree of frequency selectivity and time variance of the channel. The channel property determination unit 441 determines the frequency selectivity by using pilots included in a preamble, and determines the time variance by using pilots included in a burst and the pilots included in the preamble.

More specifically, the channel property determination unit 441 estimates channel values of data tones included in a preamble for each case where the number of pilots used in a preamble varies, then calculates MSEs of channel estimation values of respective cases using pilots excluding some pilots over a case of using all pilots, and determines the frequency selectivity according to a magnitude relation of a selectivity threshold and the MSEs of the respective cases. Herein, the cases where the number of pilots varies include a case of using all pilots, a case of using $(1+2n)^{th}$ pilots (where n is an integer greater than or equal to 1), and a case of using $(1+3n)^{th}$ pilots (where n is an integer greater than or equal to 1). For example, in each case, the MSE is calculated as illustrated in Equation 1 above, and the frequency selectivity is determined as illustrated in FIG. 3A according to the relation between the frequency selectivity threshold and the MSEs.

In addition, the channel property determination unit 441 calculates a channel estimation value of a pilot tone included in a preamble on the same subcarrier by using extrapolation on channel estimation values of pilot tones included in a burst adjacent to the preamble, calculates an MSE of a channel estimation value calculated for the pilot tone included in the preamble by using the channel estimation values of the pilot tones included in the burst over a channel estimation value determined for the pilot tone included in the preamble by using the pilot. Then, the channel property determination unit 441 determines the time variance according to a magnitude relation between the MSE and the time variance threshold.

For example, the MSE is calculated by Equation 2 above, and the frequency selectivity is determined as illustrated in FIG. 3B according to the relation between the MSE and the time variance threshold.

The pilot estimator 443 estimates a channel value of a pilot tone. The pilot is a signal with a value pre-agreed between a transmitting end and the receiving end, and thus the pilot estimator 443 estimates the channel value of the pilot tone by using the pre-agreed value and a received value of the pilot. For example, if the pilot has a value of 1, a channel estimation value of the pilot tone is the received value of the pilot.

The estimation controller 445 determines a position of data tones to which the first estimation scheme is applied according to a decision of the channel property determination unit 441, and announces the position of the data tones to the first estimator 447. In this case, the number of data tones to which the first estimation scheme is applied between pilot tones on the same subcarrier is increased in proportion to the magnitude of the frequency selectivity. In addition, the number of data tones to which the first estimation scheme is applied between pilot tones on the same symbol is increased in proportion to the magnitude of the time variance. For example, if the frequency selectivity is divided into 3 categories and the time variance is divided into 2 categories, the data tones to which the first estimations scheme is applied are distributed as illustrated in FIGS. 1A to 1F above according to the channel property.

The first estimator 447 determines channel estimation values of the data tones located in the position indicated by the estimation controller 445 according to the first estimation scheme. For example, the first estimation scheme may be a Wiener scheme, an MMSE scheme, etc. When using the Wiener scheme, the first estimator 447 determines a Wiener weight by considering noise power, Doppler frequency, delay spread, etc., and then estimates channel values of the data tones by using the Wiener weight.

The second estimator 449 determines channel estimation values estimated for remaining data tones other than the data tones by using the first estimator 447 according to the second estimation scheme. For example, the second estimation scheme may be linear interpolation, LPF, etc. In this case, the second estimator 449 uses channel estimation values estimated for both data tones and pilot tones and provided from the first estimator 447 as channel estimation values of pilot tones.

Figure 5:
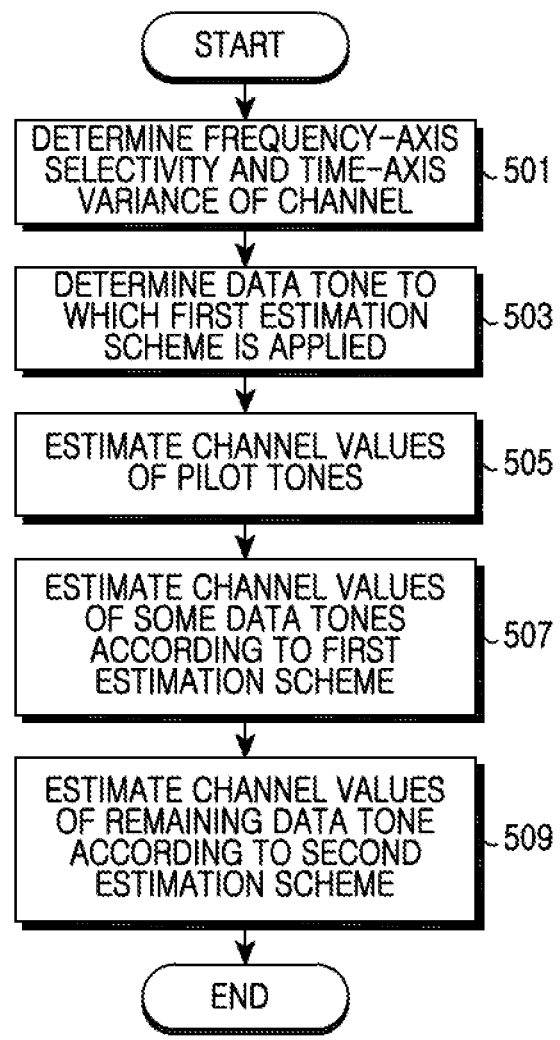
FIG. 5 is a flowchart illustrating a channel estimation process of a receiving end in a wireless communication system according to an exemplary embodiment of the present invention.

FIG. 5 is a flowchart illustrating a channel estimation process of a receiving end in a wireless communication system according to an exemplary embodiment of the present invention.

Referring to FIG. 5, the receiving end determines time-axis variance and frequency selectivity of a channel in step 501. The receiving end determines the frequency selectivity by using pilots included in a preamble, and determines the time variance by using pilots included in a burst and the pilots included in the preamble. More specifically, the receiving end estimates channel values of data tones included in a preamble for each case where the number of pilots used in a preamble varies, then calculates MSEs of channel estimation values of respective cases using pilots excluding some pilots over a case of using all pilots, and determines the frequency selectivity according to a magnitude relation of a selectivity threshold and the MSEs of the respective cases. Herein, the cases where the number of pilots varies include a case of using all pilots, a case of using $(1+2n)^{th}$ pilots (where n is an integer greater than or equal to 1), and a case of using $(1+3n)^{th}$ pilots (where n is an integer greater than or equal to 1). For example, in each case, the MSE is calculated as illustrated in Equation 1 above, and the frequency selectivity is determined as illustrated in FIG. 3A according to the relation between the frequency selectivity threshold and the MSEs. In addition, the receiving end calculates a channel estimation value of a pilot tone included in a preamble on the same subcarrier by using extrapolation on channel estimation values of pilot tones included in a burst adjacent to the preamble, calculates an MSE of a channel estimation value calculated for the pilot tone included in the preamble by using the channel estimation values of the pilot tones included in the burst over a channel estimation value determined for the pilot tone included in the preamble by using the pilot. Then, the receiving end determines the time variance according to a magnitude relation between the MSE and the time variance threshold. For example, the MSE is calculated by Equation 2 above, and the frequency selectivity is determined as illustrated in FIG. 3B according to the relation between the MSE and the time variance threshold.

After determining the frequency selectivity and the time-axis variance, proceeding to step 503, the receiving end determines data tones to which the first estimation scheme is applied. That is, the receiving end determines a position of the data tones to which the first estimation scheme is applied according to the decision made in step 501. In this case, the number of data tones to which the first estimation scheme is applied between pilot tones on the same subcarrier is increased in proportion to the magnitude of the frequency selectivity. In addition, the number of data tones to which the first estimation scheme is applied between pilot tones on the same symbol is increased in proportion to the magnitude of the time variance. For example, if the frequency selectivity is divided into 3 categories and the time variance is divided into 2 categories, the data tones to which the first estimation scheme is applied are distributed as illustrated in FIGS. 1A to 1F above according to the channel property.

After determining the data tones to which the first estimation scheme is applied, proceeding to step 505, the receiving end estimates channel values of the pilot tones. The pilot is a signal with a value pre-agreed between a transmitting end and the receiving end, and thus the receiving end estimates the channel value of the pilot tone by using the pre-agreed value and a received value of the pilot. For example, if the pilot has a value of 1, a channel estimation value of the pilot tone is the received value of the pilot.

After estimating the channel value of the pilot tones, proceeding to step 507, the receiving end estimates channel values of some data tones according to the determination result of step 503 by using the first estimation scheme. For example, the first estimation scheme may be a Wiener scheme, an MMSE scheme, etc. When using the Wiener scheme, the receiving end determines a Wiener weight by considering noise power, Doppler frequency, delay spread, etc., and then estimates channel values of the data tones by using the Wiener weight.

In step 509, the receiving end estimates channel values of the remaining data tones of which channel estimation values are not determined, according to the second estimation scheme. For example, the second estimation scheme may be linear interpolation, LPF, etc. In this case, the receiving end uses channel estimation values of data tones determined in step 505 and channel estimation values of pilot tones determined in step 507 as channel estimation values of pilot tones.

According to exemplary embodiments of the present invention, when estimating a channel in a wireless communication system, channel estimation schemes each having different performance are used by properly combining the schemes by considering frequency selectivity and time variance of the channel. Therefore, a tradeoff problem between channel estimation performance and a computation amount is effectively addressed, and the channel estimation performance can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for estimating a channel of a receiving end in a wireless communication system, the method comprising:
   determining channel estimation values of pilot tones;
   selecting data tones as first semi-pilots, to which a first estimation scheme is applied, according to a frequency selectivity and a time-axis variance of the channel, wherein other data tones are selected as second semi-pilots between the pilot tones or the first semi-pilots on a same subcarrier according to a corresponding increased frequency selectivity or on a same symbol according to a corresponding increased time variance;
   determining channel estimation values of the data tones selected as the semi-pilots according to the first estimation scheme by using the channel estimation values of the pilot tones; and
   determining channel estimation values of the remaining data tones according to a second estimation scheme by using the channel estimation values of the pilot tones and the channel estimation values of the semi-pilots determined by the first estimation scheme.

2. The method of claim 1, further comprising:
   estimating channel values of the selected data tones included in a preamble for each different number of pilots used in the preamble;
   calculating Mean Square Errors (MSEs) of the estimated channel values of respective numbers of pilots excluding some pilots over using all pilots; and
   determining the frequency selectivity according to a magnitude relation between the MSEs and a frequency selective threshold for each number of pilots.

3. The method of claim 2, further comprising, when each different number of pilots is used in the preamble, one of a first case of using all of the pilots, a second case of using ½ pilots among all of the pilots, and a third case of using ⅓ pilots among all of the pilots.

4. The method of claim 3,
   wherein the frequency selectivity is determined to be one of high, medium, and low, and
   wherein the determining of the frequency selectivity comprises:
   determining the frequency selectivity to be high if both the MSE of the second case over the first case and the MSE of the third case over the first case are greater than or equal to the threshold;
   determining the frequency selectivity to be medium if the MSE of the second case over the first case is less than or equal to the threshold and if the MSE of the third case over the first case is great than or equal to the threshold; and
   determining the frequency selectivity to be low if both the MSE of the second case over the first case and the MSE of the third case over the first case are less than or equal to the threshold.

5. The method of claim 4, wherein the MSE of the second case over the first case and the MSE of the third case over the first case are determined by:

$$\left( MSE_{Np/2} = \frac{1}{\text{Num\_data}} \sum_{i=1}^{\text{Num\_data}} \frac{|\hat{H}_{Np(i)} - \hat{H}_{Np/2(i)}|^2}{|\hat{H}_{Np(i)}|^2}, \right.$$

$$\left. MSE_{Np/3} = \frac{1}{\text{Num\_data}} \sum_{i=1}^{\text{Num\_data}} \frac{|\hat{H}_{Np(i)} - \hat{H}_{Np/3(i)}|^2}{|\hat{H}_{Np(i)}|^2} \right),$$

where Np denotes the number of all pilots, $MSE_{Np/2}$ denotes an MSE of the second case over the first case, Num_data denotes the number of data tones included in a preamble, i comprises an index, $\hat{H}_{Np(i)}$ denotes a channel estimation value of an $i^{th}$ data tone in the first case, $\hat{H}_{Np/2(i)}$ denotes a channel estimation value of an $i^{th}$ data tone in the second case, $MSE_{NP/3}$ denotes an MSE of the third case over the first case, and $\hat{H}_{Np/3(i)}$ denotes a channel estimation value of an $i^{th}$ data tone in the third case.

6. The method of claim 1, further comprising:
calculating a channel estimation value of a pilot tone included in a preamble on a same subcarrier by using extrapolation on channel estimation values of pilot tones included in a burst adjacent to the preamble;
calculating a Mean Square Error (MSE) of the channel estimation value calculated for the pilot tone included in the preamble by using the channel estimation values of the pilot tones included in the burst over the channel estimation value that was determined for the pilot tone included in the preamble by using the pilot; and
determining the time variance according to a magnitude relation between the MSE and a time variance threshold.

7. The method of claim 6,
wherein the time variance is determined to be one of high and low, and
wherein the determining of the time variance comprises:
determining the time variance to be high if the MSE is greater than or equal to the threshold; and
determining the time variance to be low if the MSE is less than the threshold.

8. The method of claim 7, wherein the MSE is determined by:

$$\left( MSE_{extra} = \frac{1}{\text{Num\_extra}} \sum_{i=1}^{\text{Num\_extra}} \frac{|\hat{H}_{preamble(i)} - \hat{H}_{extra(i)}|^2}{|\hat{H}_{preamble(i)}|^2} \right),$$

where $MSE_{extra}$ denotes the MSE, Num_extra denotes the number of subcarriers used to determine time variance, i comprises an index, $\hat{H}_{preamble(i)}$ denotes a channel estimation value determined for an $i^{th}$ pilot tone included in a preamble by using the pilot, and $\hat{H}_{extra(i)}$ denotes a channel estimation value calculated for an $i^{th}$ pilot tone included in a preamble by using extrapolation.

9. The method of claim 1, wherein the first estimation scheme comprises one of Minimum Mean Square Error (MMSE) and Wiener filtering.

10. The method of claim 1, wherein the second estimation scheme comprises one of linear interpolation and Low Pass Filter (LPF).

11. A receiving apparatus in a wireless communication system, the apparatus comprising:
a pilot estimator for determining channel estimation values of pilot tones;
a determination unit for selecting data tones as first semi-pilots, to which a first estimation scheme is applied, according to a frequency selectivity and a time-axis variance of the channel, wherein other data tones are selected as second semi-pilots between the pilot tones or the first semi-pilots on a same subcarrier according to a corresponding increased frequency selectivity or on a same symbol according to a corresponding increased time variance;
a first estimator for determining channel estimation values of the data tones selected as the semi-pilots according to the first estimation scheme by using the channel estimation values of the pilot tones; and
a second estimator for determining channel estimation values of the remaining data tones according to a second estimation scheme by using the channel estimation values of the pilot tones and the channel estimation values of the semi-pilots determined by the first estimation scheme.

12. The apparatus of claim 11, wherein the determination unit estimates channel values of the selected data tones included in a preamble for each different number of pilots used in the preamble, calculates Mean Square Errors (MSEs) of the estimated channel values of respective numbers of pilots excluding some pilots over using all pilots, and determines the frequency selectivity according to a magnitude relation between the MSEs and a frequency selective threshold for each number of pilots.

13. The apparatus of claim 12, further comprising, when each different number of pilots is used in the preamble, one of a first case of using all of the pilots, a second case of using ½ pilots among all of the pilots, and a third case of using ⅓ pilots among all of the pilots.

14. The apparatus of claim 13,
wherein the frequency selectivity is determined to be one of high, medium, and low, and
wherein the determination unit determines the frequency selectivity to be high if both the MSE of the second case over the first case and the MSE of the third case over the first case are greater than or equal to the threshold, determines the frequency selectivity to be medium if the MSE of the second case over the first case is less than or equal to the threshold and if the MSE of the third case over the first case is great than or equal to the threshold, and determines the frequency selectivity to be low if both the MSE of the second case over the first case and the MSE of the third case over the first case are less than or equal to the threshold.

15. The apparatus of claim 14, wherein the MSE of the second case over the first case and the MSE of the third case over the first case are determined by:

$$\left( MSE_{Np/2} = \frac{1}{\text{Num\_data}} \sum_{i=1}^{\text{Num\_data}} \frac{|\hat{H}_{Np(i)} - \hat{H}_{Np/2(i)}|^2}{|\hat{H}_{Np(i)}|^2}, \right.$$

$$\left. MSE_{Np/3} = \frac{1}{\text{Num\_data}} \sum_{i=1}^{\text{Num\_data}} \frac{|\hat{H}_{Np(i)} - \hat{H}_{Np/3(i)}|^2}{|\hat{H}_{Np(i)}|^2} \right),$$

where Np denotes the number of all pilots, $MSE_{Np/2}$ denotes an MSE of the second case over the first case, Num_data denotes the number of data tones included in a preamble, i comprises an index, $\hat{H}_{NP(i)}$ denotes a channel estimation value of an $i^{th}$ data tone in the first case, $\hat{H}_{Np/2(i)}$ denotes a channel estimation value of an $i^{th}$ tone in the second case, $MSE_{Np/3}$ denotes an MSE of the third case over the first case, and $\hat{H}_{Np/3(i)}$ denotes a channel estimation value of an $i^{th}$ data tone in the third case.

16. The apparatus of claim 11, wherein the determination unit calculates a channel estimation value of a pilot tone included in a preamble on a same subcarrier by using extrapolation on channel estimation values of pilot tones included in a burst adjacent to the preamble, calculates a Mean Square Error (MSE) of the channel estimation value calculated for the pilot tone included in the preamble by using the channel estimation values for the pilot tones included in the burst over the channel estimation value that was determined for the pilot tone included in the preamble by using the pilot, and determines the time variance according to a magnitude relation between the MSE and a time variance threshold.

17. The apparatus of claim 16,
wherein the time variance is determined to be one of high and low, and
wherein the determination unit determines the time variance to be high if the MSE is greater than or equal to the threshold, and determines the time variance to be low if the MSE is less than the threshold.

18. The apparatus of claim 17, wherein the MSE is determined by:

$$\left( MSE_{extra} = \frac{1}{\text{Num\_extra}} \sum_{i=1}^{Num\_extra} \frac{|\hat{H}_{preamble(i)} - \hat{H}_{extra(i)}|^2}{|\hat{H}_{preamble(i)}|^2} \right),$$

where $MSE_{extra}$ denotes the MSE, Num_extra denotes the number of subcarriers used to determine time variance, i comprises an index, $\hat{H}_{preamble(i)}$ denotes a channel estimation value determined for an $i^{th}$ pilot tone included in a preamble by using the pilot, $\hat{H}_{extra(i)}$ denotes a channel estimation value calculated for an $i^{th}$ pilot tone included in a preamble by using extrapolation.

19. The apparatus of claim 11, wherein the first estimation scheme comprises one of Minimum Mean Square Error (MMSE) and Wiener filtering.

20. The apparatus of claim 11, wherein the second estimation scheme comprises one of linear interpolation and Low Pass Filter (LPF).

* * * * *